455-600 AU 233 EX

FIP8106 XR 3,322,935

May 30, 1967 A. A. WYKE ET AL 3,322,935

OPTICAL READOUT DEVICE WITH COMPENSATION FOR MISREGISTRATION

Filed July 8, 1963 3 Sheets-Sheet 1

INVENTORS.
ALBERT A. WYKE
BY DAMOND V. RYER

Fred Jacob
ATTORNEY

INVENTORS.
ALBERT A. WYKE
BY DAMOND V. RYER
Fred Jacob

OPTICAL READOUT DEVICE WITH COMPENSATION FOR MISREGISTRATION

Filed July 8, 1963 3 Sheets-Sheet [illegible]

INVENTORS.
ALBERT A. WYKE
DAMOND V. RYER
BY Fred Jacob

United States Patent Office 3,322,935
Patented May 30, 1967

3,322,935
OPTICAL READOUT DEVICE WITH COMPENSATION FOR MISREGISTRATION

Albert A. Wyke, Needham, and Damond V. Ryer, Cambridge, Mass., assignors to Honeywell Inc., a corporation of Delaware Filed July 8, 1963, Ser. No. 293,455
17 Claims. (Cl. 235—61.11)

ABSTRACT OF THE DISCLOSURE

Document scanning apparatus for interpreting code marks passing along a particular optical track, along various "misregistration" paths with respect to a "neutral path," the apparatus including a bank of read cells bracketing this track, being adapted to interpret the output thereof to indicate code position and responsively select "registered" cells for code interpreting.

The present invention relates in general to new and improved apparatus for reading information out of a storage medium, in particular to apparatus for compensating for any misregistration of the information during the readout process.

Misregistration or registration error of the stored information during readout, i.e. the failure of the information to appear in a predetermined location on the storage medium with respect to the readout apparatus, is a common problem which, unless eliminated or compensated for, will affect the reliability of the readout process. Such misregistration may be due to a departure of the storage medium from its normal form. For example, if the storage medium is a rectangular document, the edges may not be parallel. Misregistration may also be caused by alignment errors which occurred during the process of storing the information. For example, the stored information may be located too close to one edge of the aforesaid document. Misregistration due to these causes is particularly prevalent in documents from which printed information is to be read out.

Another cause of misregistration may be the displacement from its normal path of the storage medium which carries the information. Such displacement frequently occurs where, due to the ability of the receiving equipment to handle large quantities of data, fast readout of the medium is necessary which, in turn, requires a rapid relative movement of the storage medium and the readout apparatus.

In prior art devices, a great deal of effort has been expended to minimize the amount of misregistration which can occur. These efforts, while quite expensive, have been fairly successful in such storage media as tape and magnetic drums and discs. Unless fairly low data storage densities are involved, however, document readers do not enjoy the same degree of success, especially in the case of small and flexible documents such as checks, stubs, coupons, etc. In the latter case, the readout equipment must be adapted to recognize relevant document information under conditions of misregistration which may differ for each document and it must compensate for each accordingly.

The proper operation of equipment which compensates for registration errors further requires that changing conditions of misregistration be properly recognized without the loss of information and without detriment to the reliability of the readout process. It is also desirable that the readout of information continue when portions of the information are lost, without affecting the reliability of the readout process.

In the past, this required very complex equipment with the attendant high cost of initial acquisition and maintenance. Moreover, an acceptable degree of reliability was possible only at relatively low data storage densities so that the amount of information carried by the document was limited.

It is the primary object of the present invention to provide apparatus for compensating for the misregistration of stored information during the readout of the latter from a storage medium, which overcomes the foregoing disadvantages.

It is another object of the present invention to provide apparatus for reading out a storage medium wherein relatively simple and inexpensive equipment is employed to compensate for misregistration of the stored information during readout.

It is a further object of the present invention to provide apparatus for reading out a storage medium wherein the circuitry used for compensating for the misregistration of the stored information during readout has a high degree of reliability.

It is an additional object of the present invention to provide a document reader which operates reliably under changing conditions of misregistration and when portions of the stored information are lost.

In the present invention a plurality of scanning cells is used which brackets at least one track of relevant information on the storage medium during the relative motion between the latter and the cells. The scanning cells are so disposed with relation to the track that, in the normally neutral position of the latter, a certain number of the cells scan the track proper while the remaining cells scan the document to either side of the track boundaries. At least one of the track boundaries is spaced from extraneous information on the storage medium by a guard band which dictates the minimum spacing. A predetermined number of the aforesaid cells bracket this boundary.

Each of the scanning cells provides an output signal in accordance with the storage medium portion scanned by it. The signals derived from these cells which bracket one of the track boundaries are logically combined to obtain registration control signals, each indicative of a different registration error, i.e. of a different degree of misregistration of the track with respect to the scanning cells. A selection is made in accordance with the prevailing registration control signal to select those scanning cells which are most nearly centered on the track under the corresponding registration conditions. In order to permit continuous readout even if portions of the information scanned by some of the cells are lost, the scanning cells so selected are further examined for the presence of signals from at least a majority of cells, at least a pair of which must be adjacent to each other. A single track output signal is then derived from these cells.

These and other novel features of the invention together with further objects and advantages thereof will become apparent from the following detailed specification with reference to the accompanying drawings in which:

FIGURE 1 illustrated a preferred embodiment of a scanning station which is used in the present invention;

FIGURE 2 schematically illustrates an information readout system in accordance with the present invention, including misregistration compensation apparatus;

Figure 1:
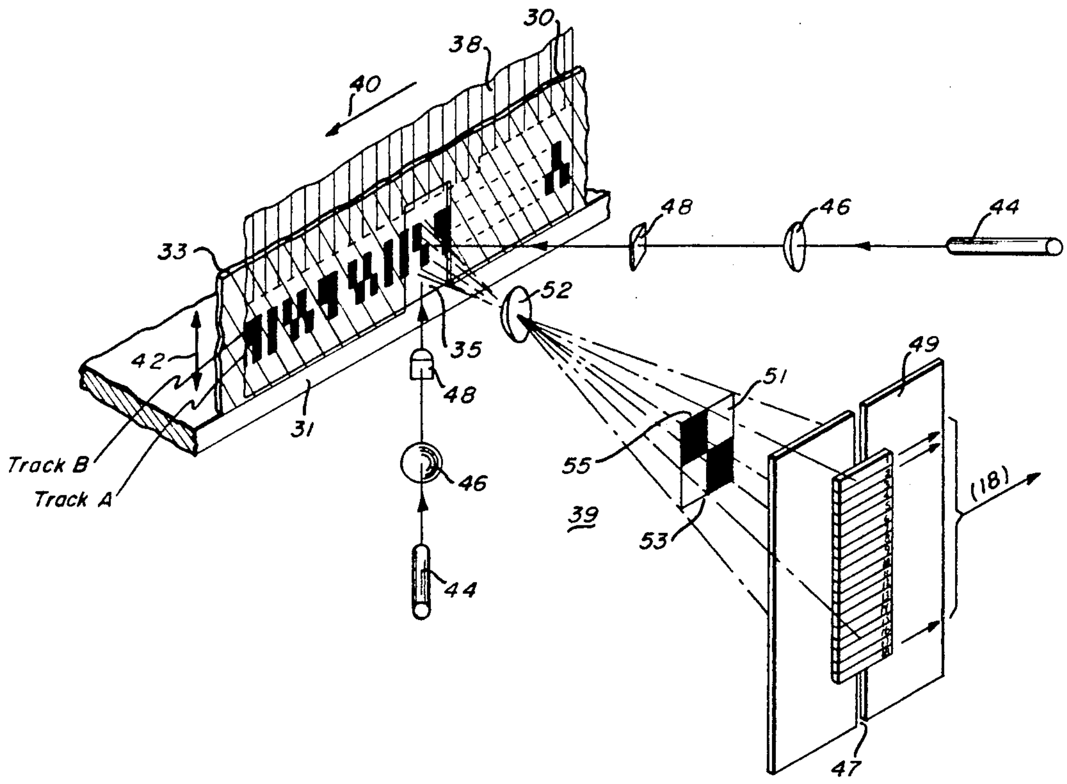

With reference now to the drawings and more particularly to FIGURE 1 thereof, the invention is illustrated with respect to a document reader of the type disclosed in a copending application by Damon V. Ryer, entitled Data Processing Apparatus, filed July 8, 1963, Ser. No. 293,351, which is assigned to the assignee of the present invention. The document 30 may be a redemption coupon or the like which, in addition to extraneous information 38, has printed thereon a pair of information tracks, respectively labeled Track A and Track B. In the illustrated embodiment of the invention, these tracks are assumed to contain the document information which is relevant for the present purpose. The information may be imprinted in a di-bit bar code such as is disclosed in a copending application by Walter H. Gray et al., entitled "Information-Bearing Document," filed Feb. 18, 1963, Ser. No. 259,027, which is assigned to the assignee of the present application.

The tracks are seen to adjoin each other along a common boundary, each track consisting of black and white bars wherein the transition from white to black or from black to white may be representative of the chosen binary digit, as disclosed in the aforesaid copending application, Ser. No. 259,027. A bit period therefore corresponds to the width of two of the aforesaid bars. The presence or absence of a transition in the center of this interval, but not at its ends, determines the significance of the bit stored.

The free boundary of the lower track, i.e., of Track A, is normally spaced a predetermined distance from the lower edge of the document 30. However, alignment errors during the printing of the document, or poor workmanship in cutting the document blank to size, may produce substantial deviations from the norm. These may vary even within a single document when, for example, the blank is cut at a slant. The free boundary of the Track B, in this case the upper boundary, is separated from the extraneous document information 38 by a guard band which prescribes a predetermined minimum spacing, as shown in FIGURE 1. No upper limit exists to the extent of the spacing.

In the illustrated embodiment of the invention, the document is assumed to move along a deck 31 in the direction of the single-ended arrow 40. A suitable support rearwardly of the document, flattens the latter against an opaque shield 33 during the movement of the document. The shield has been shown as transparent for the purpose if illustrating the document behind it. An opening 35 in the shield exposes a small document portion to a scanning station 39. Misregistration of the track pair due to any of the aforementioned causes occurs in the direction of the double-ended arrow 42. It will be understood that skewing as well as lateral transposition of the document may give rise to misregistration. While misregistration in a downward direction due to faulty document printing or cutting may be present, the deck 31 precludes a downward displacement of the document itself and hence it prevents downward misregistration of the tracks due to this cause. Document displacement in an upward direction cannot be prevented since allowance must be made for documents of different sizes.

The scanning station 39 includes a pair of light sources 44, a pair of collimating lens systems 46 and a pair of condensing lenses 48. The portion of the movement document which is exposed by the opening 35 is thus illuminated from two directions. Because of the shielding of the remainder of the document the only contribution which reaches the receiving lens 52 is attributable to the illuminated document portion. The image 51 of the latter is magnified and is projected in inverted form onto a vertical column of adjacent light-sensitive cells 1–18. A slit 47 in a mask 49, that is positioned in front of the cell column, admits only a narrow vertical section of the magnified image 51 to the cells.

In the neutral position of the image which is illustrated in FIGURE 1, the cells are seen to bracket the projected image which covers cells 2–15 inclusive, each track occupying seven cells. Cell 1 is normally located above the free boundary 55 of the projected image 51 and therefore it scans the space below Track A. The boundary 53 falls between the cells 15 and 16 and therefore, in the neutral position, cells 16 and 17 scan the guard band which separates the latter from the extraneous document information 38. The projection of the image is preferably such that the above-mentioned guard band is equal to the vertical width of two cells. The cell 18 therefore, may be scanning extraneous information in the left hand portion of the coupon 30 where minimum spacing conditions between Track B and the extraneous information 38 prevail. Each cell is adapted to provide an output signal in response to the horizontal document portion scanned by it through the slit 47. Continuous black or white will result in a D.C. output signal, while each transition will produce a polarity reversal so as to produce an A.C. signal.

Figure 2:
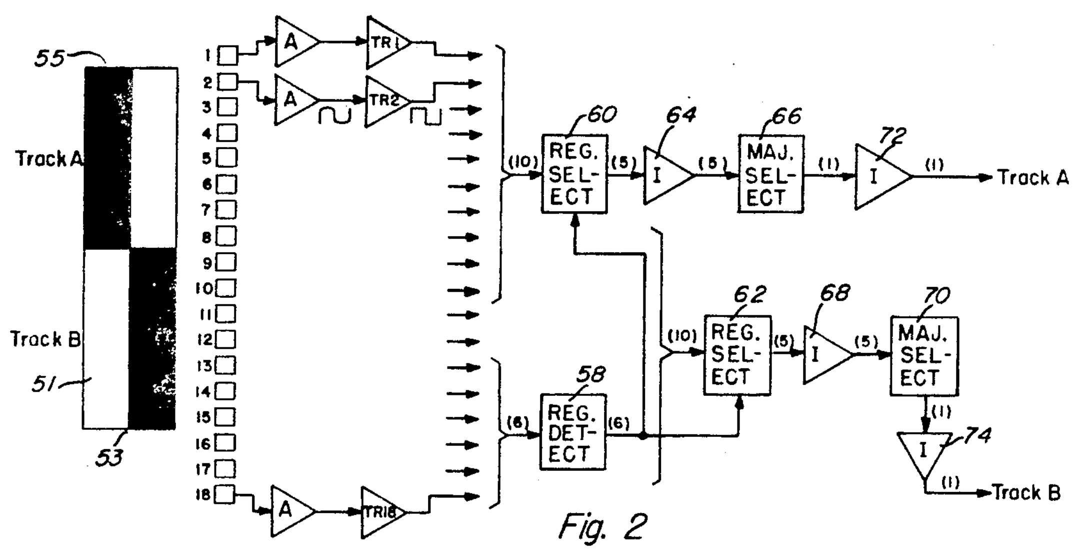

FIGURES 2 illustrates schematically the relationship of the projected inverted track image 51 in its normally neutral position with respect to the sensing cells. As in the case of FIGURE 1, the cells 1–18 bracket the image so that the free boundary 55 falls between the cells 1 and 2 and the free boundary 53 falls between the cells 15 and 16. Each cell output signal is applied to an amplifier which is further coupled to a trigger circuit, appropriately labeled in accordance with the corresponding cell. Representative amplifier and trigger output signals are illustrated in FIGURE 2 for alternating transitions sensed by the cell 2.

The cells 13–18 bracket the boundary 53 of the projected image which, as previously explained, is spaced from the non-relevant information 38 on the document 30 by at least two cell widths. The six output signals from the cells 13–18, upon being amplified and applied to the associated trigger circuits, are coupled to a registration detection circuit 58 which provides six registration control signals at its output, as indicated by the designation (6). The details of the registration detection circuit are discussed below in connection with FIGURE 3 and it will suffice here to say that each signal is indicative of a particular position of the image with respect to the neutral position.

The ten output signals of the cells 1–10 which bracket Track A as projected, are amplified and applied to their associated trigger circuits, whence they are coupled to a registration selection matrix 60. The details of the latter matrix are discussed in greater detail below in connection with FIGURE 4. Similarly, the ten output signals from the cells 8–17 which bracket Track B as projected, are amplified and applied to their associated trigger circuits, whence they are coupled to a registration selection matrix 62 which is substantially identical to the matrix 60. It will be noted that the cell groups 1–10 and 8–18 respectively, overlap. The overlap includes the cells 8 and 9 which straddle the common boundary between the two tracks when the projected image is in its neutral position.

The six output signals of the registration detection circuit 58 are coupled to the registration selection matrices 60 and 62 respectively. A five-line output from the registration selection matrix 60 is coupled to an inverter 64 whose output is further coupled to a majority selection matrix 66. The output of the latter consists of a single line which is connected to an inverter 72. A signal representative of the encoded information in Track A is derived at the output of the inverter 72. Similarly, the five output signals of the registration selection matrix 62 are each coupled to an inverter 68 whose output is further coupled to a majority selection matrix 70 which is substantially identical with matrix 66. The single-line output of matrix 70 is coupled to an inverter 74 the output of which constitutes the Track B signal.

Figure 3:
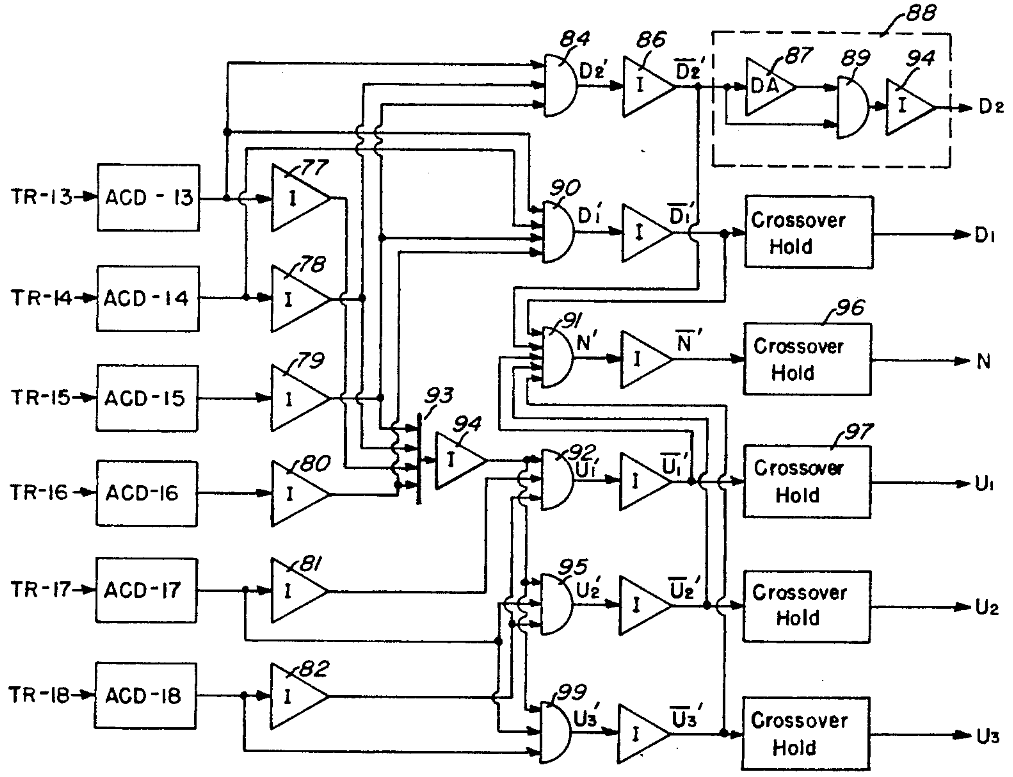
FIGURE 3 illustrates in greater detail the registration detection circuit of the apparatus of FIGURE 2.

FIGURE 3 illustrates in greater detail the registration detection circuit 58 of FIGURE 2. The output signals of the trigger TR–13 to TR–18 are applied to correspondingly labeled A.C. detection circuits. The latter circuits are conventional in construction and are of the type which provide a bilevel output signal having a first level, e.g. a negative voltage, when an A.C. input signal is applied and a second level, which may be 0, when a D.C. input signal is applied. Each of the units further has an inherent delay characteristic such that a change of the output signal level occurs only when the changed input signal is present for an interval of approximately three bit periods.

The outputs of the detectors ACD–13 to ACD–18 are coupled to inverters 77 to 82 respectively. A gate 84 is connected to the output of the inverters 78 and 79 and to the outputs of the A.C. detector ACD–13, respectively. The output of the gate 84 is coupled to an inverter 86 whose output is further coupled to a crossover hold circuit 88. The latter consists of a delay amplifier 87 which is connected between the output of the inverter 86 and one input leg of a gate 89. The other input leg of gate 89 is connected directly to the output of the inverter 86. An inverter 94 is coupled to the output of the gate 89 and provides a bilevel registration control signal $D_2$ at its own output.

Under the assumed operating conditions, when the signal $D_2$ is negative, it is indicative of the fact that the scanned portion of the pair of code tracks is displaced downwardly from its normal neutral position by a distance which causes the magnified image projected on the scanning cells to be vertically displaced by two scanning cell widths. It will be noted that while the actual displacement from the normal neutral position of the scanned track portion is in a downward direction, the image inversion produced by the lens 52 causes the projected image to be displaced upwardly from its normal neutral position with respect to the cell column.

In order to satisfy the input conditions which will render the gate 84 conductive, all signals applied to the input thereof must have the aforesaid negative signal level. This in turn requires that the detector ACD–13 senses an A.C. signal, while the detectors ACD–14, ACD–15 must sense D.C. so that the aforesaid negative signal level is obtained at the output of the inverters 78 and 79. These conditions follow from a consideration of FIGURES 1 and 2. When the free boundary of Track B is displaced downwardly by the requisite amount, the image boundary 53 moves up by two cell widths. Thus, the cell 13 will continue to scan the Track B, but the cells 14 and 15 will now scan the space above the free-track boundary and hence they will sense D.C. It will be noted that some or all of the cells 16–18 may now scan the extraneous document information 38 so as to indicate A.C. at the output of the associated A.C. detectors. This action is, however, without effect on the gate 84 which is only coupled to the cells 13–15. Under these conditions, the gate 84 will become conductive and will couple a signal to the inverter amplifier 86. The latter, in turn will energize the crossover hold circuit 88, at the output of which the registration control signal $D_2$ is obtained.

It will be noted that two signal inversions occur between the output of the gate 84 and the output of the crossover hold circuit 88 which are due to the action of the inverters 86 and 94 respectively. Thus, the output signal of the gate 84 may be considered to be logically equivalent to $D_2$ and the output signal of the inverter 86 is equivalent to $\overline{D}_2$. Accordingly these signals are labeled $D_2'$ and $\overline{D}_2'$ respectively.

When the equivalent signal $D_2'$ at the output of the gate 84 is terminated, $\overline{D}_2'$ appears at the output of the inverter 86 and is applied directly to one input leg of the gate 89, as well as to the other gate input leg by way of the delay amplifier 87. The latter may have a 1 $\mu$s. delay delay so that the gate 89 becomes conductive only after one microsecond. As a consequence, the negative signal level of the output signal $D_2$ from the inverter 94, persists for one microsecond before it becomes zero. Alternatively, when the equivalent signal $D_2'$ at the output of the gate 84 first appears, i.e. when its level initially goes negative, the signal $\overline{D}_2'$ at the output of the inverter 86 goes to a zero immediately and the output signal of the gate 89 similarly goes to zero. Under these conditions the signal $D_2$, which appears at the output of the inverter 94, goes negative immediately.

A gate 90 has its input connected to the detectors ACD–13 and ACD–14, as well as to the inverters 79 and 80. The gate output is connected as in the case of gate 84, i.e. to an inverter and crossover hold circuit. The latter is substantially identical to that described above and provides the bilevel registration control signal $D_1$ at its output. The signal $D_1$ will prevail when there is a downward displacement of the scanned track portion from its normal neutral position which produces an opposite displacement of the projected image by one cell width. Under these conditions, the Track B is scanned by the cells 13 and 14. Since the spacing between the free boundary of Track B (the upper information track) from the nearest non-relevant document information above is at least two cell widths when projected onto the cell column, the cells 15 and 16 must, under these conditions, sense a blank space.

Accordingly, in order for the gate 90 to become conductive, the detectors ACD–13 and ACD–14 must provide negative signal levels indicative of the presence of an A.C. signal. Since the detectors ACD–15 and ACD–16 sense D.C. they will provide zero output signal levels so that negative signal levels are obtained at the outputs of the connected inverters 79 and 80 respectively. The bilevel registration control signal $D_1$ is then derived in substantially the same manner from the associated crossover hold circuit as described above in connection with the signal $D_2$.

Any misregistration of the scanned track portion in an upward direction, will produce a downward displacement of the projected image from its normal neutral position. As may be established with reference to FIGURES 1 and 2, where the projected image is displaced downwardly by one cell width, the cells 13, 14, 15 and 16 will all scan Track B and the detectors ACD–13, ACD–14, ACD–15 and ACD–16 will sense A.C. This condition is logically taken into account by buffering together the inverted output signals of the aforementioned A.C. detectors in a buffer 93 the output of which is coupled to an inverter 94. The output of the inverter 94 will have a negative signal level under the assumed operation conditions which is coupled to one input leg of a gate 92. The cells 17 and 18 will scan the space above the free boundary of Track B and, accordingly, the detectors ACD–17 and ACD–18 will sense D.C. Thus, the output signals of the connected inverters 81 and 82 respectively will have a negative level, these signals being further applied to the input of the gate 92 which will become conductive. The gate output is inverted and is further applied to the crossover hold circuit 97 to provide the bilevel registration control signal $U_1$ at the output of the latter, substantially in the same manner as outlined above.

Where the misregistration of the scanned track portion is upward from its normal neutral position by an amount sufficient to displace the projected image in the opposite direction by two cell width, the detectors ACD–13 to ACD–17 inclusive will all sence an A.C. signal attributable to Track B. Only the cell 18 will scan the space between the free boundary of Track B and the non-relevant document information 38 and hence only the detector ACD–18 will sense D.C.

A gate 95 has its input connected to the inverter 94 whose negative level output signal is representative of the presence of A.C. at the input of the detectors ACD–13 to ACD–16 inclusive. The gate 95 also receives a negative-level signal from the output of the detector ACD–17 which is similarly indicative of the presence of A.C., as well as a negative-level signal from the output of the inverter 82 which is representative of a D.C. signal sensed by the detector ACD–18. The gate 95 then becomes conductive, its output being inverted and applied to a crossover hold circuit, as described above, which provides the bilevel registration control signal $U_2$ at its output.

A gate 99 is connected to the output of the inverter 94 and to the output of the detectors ACD–17 and ACD–18 if the scanned document portion is displaced sufficiently in an upward direction for the projected image to move downwardly by three cell widths. All of the detectors ACD–13 to ACD–18 will then sense A.C. signals attributable to Track B. Under these conditions, the input requirements of the gate 99 are satisfied and an output signal is applied to the subsequently connected inverter. The latter is further coupled to a crossover hold circuit, as described above, at the output of which the bilevel registration control signal $U_3$ is derived.

As explained above, the output signal $\overline{D}_2'$ of the inverter 86 is logically equivalent to $\overline{D}_2$. This holds equally true for the inverted output signals of the gates 90, 92, 95 and 99 which are therefore designated $\overline{D}_1'$, $\overline{U}_1'$, $\overline{U}_2'$ and $\overline{U}_3'$ respectively. If the foregoing signals occur simultaneously, the degree of misregistration of the scanned track portion must be zero and hence the neutral position must be true. A gate 91 is connected so that its input conditions are satisfied under these circumstances. The output signal of the gate 91 is designated N' and is applied to a subsequently connected inverter which is coupled to a crossover hold circuit 96, substantially as described above. The bilevel registration control signal N, which is indicative of the neutral position, is derved at the output of the crcuit 96.

Figure 4:
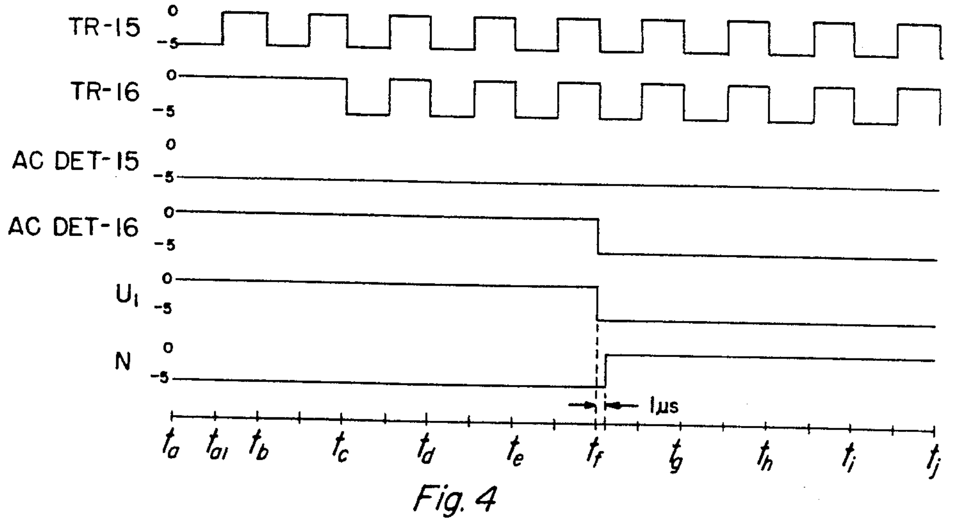
FIGURE 4 illustrates certain waveforms which are applicable to the operation of the apparatus of FIGURE 3.

The operation of certain circuit components of FIGURE 3 are illustrated with reference to the waveforms of FIGURE 4. The time scale of FIGURE 4 is seen to be divided into equal intervals, each representative of the above-defined bit period which is equal to the time required for the projected di-bit image 51 to pass the slit 49. Thus, the time interval $t_a$—$t_b$ defines one bit period. If any significant transitions are present, i.e., transitions indicative of the binary digit represented, they will only occur in the middle of each bit period, such as at time $t_{a1}$.

The two signal levels employed in the waveforms of FIGURE 4 are seen to be 0 and —5 volts. The output signals of the trigger circuits $TR_{15}$ and $TR_{16}$ are illustrated, each signal, for the sake of simplicity representing a succession of binary 1's. Let it be assumed that at time $t_a$ the projected image is in its neutral registration position, so as to cover the cells 2–15 inclusive, as shown in FIGURE 2. Under these conditions the signal N which appears at the output of the crossover hold circuit 96, will have a signal level of —5 volts, as shown, while the remaining registration control signals, such as the illustrated signal $U_1$, will have a 0 signal level. The trigger circuit TR–15 (as well as TR–13 and TR–14 whose waveforms are not shown), will provide an A.C. output signal, while TR–16 (as well as TR–17 and TR–18 which are not shown), will have a 0 output signal level. The detector ACD–15, which is responsive to the trigger circuit TR–15, has an output signal level of —5 volts, while ACD–16 has a 0 volt signal level.

As previously explained, each A.C. detector provides a delay such that a change of level of the output signal occurs only approximately a three-bit period after a change of input conditions occurred. Since special code marks in the information tracks may occupy as much as a two-bit interval, this delay prevents the A.C. detector output signal from changing levels due to the occurrence of such a code mark. Accordingly at time $t_f$, i.e. three-bit periods after $t_c$, the gate 92 will become conductive to apply a signal to the input of the crossover hold circuit 97.

Since all the crossover hold circuits are substantially identical to the circuit 88 whose operation was discussed above, the —5 volt level of the registration control signal N at the output of the circuit 96, will persist for a 1 μs. interval after time $t_f$, as shown in FIGURE 4. The registration control signal $U_1$, however, which is derived from the circuit 97, will assume the —5 volt level immediately at time $t_f$. As a consequence, there is an overlap of 1 μs. after the time the registration control signal $U_1$ becomes effective by going to —5 volts and the time the signal N goes to 0. This operation prevents a situation from arising where there is no registration control signal whatever.

Figure 5:
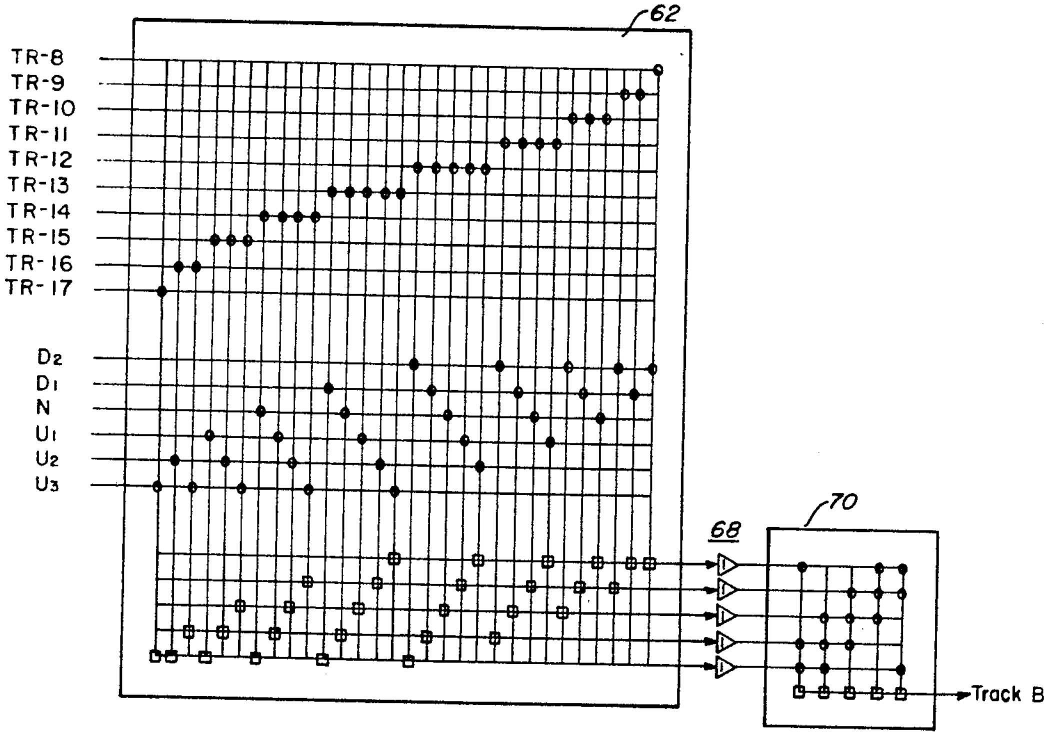
FIGURE 5 illustrates in greater detail the registration and majority selection matrices of the apparatus of FIGURE 2.

As mentioned in connection with FIGURE 2, six registration control signals are derived from the registration detection circuit 58 which operate to select five of the ten input signals of each of the registration selection matrices. As previously indicated, the registration selection matrices 60 and 62 are substantially identical for both tracks. This is also true for the majority selection matrices 66 and 70. FIGURE 5 illustrates schematically the registration selection matrix 62 and the majority selection matrix 70, each of which may consist of a diode matrix of a type well known in the art. In FIGURE 5, circles denote an "and" function and squares denote an "or" function.

In essence, the function of the registration control signals is to select those cells which are most nearly centered on the particular track and which therefore have the best chance to scan correct information. Even so, each of the selected cells may not always provide information signals. This may be due to a variety of reasons, e.g., obliteration of the track portion under the cell, tearing of the document, etc. As a consequence, a representative track signal must sometimes be derived from less than all of the selected cells. The criteria employed in the majority selection matrix 70, is to provide a track signal if signals are derived from a majority of the selected cells, at least two of which are adjacent cells.

Let it be assumed that the registration control signal N prevails, indicative of the neutral position of the scanned information track portion. It will be noted from FIGURE 5 that the signal N is gated together with the output signal of the triggers TR–14, TR–13, TR–12, TR–11 and TR–10 respectively. The foregoing trigger circuit signals then appear on the five output lines of the matrix 62 whence they are inverted by the inverters 68 and applied to the majority selection matrix 70. In accordance with the above-stated criteria, the latter is so arranged that at least three out of the five input signals must be present in order for there to be an output signal labeled Track B.

This is true only provided these signals are not derived from the first, middle and last one of the five selected cells. The elimination of the last case is based on the lack of probability that a document is defaced in a manner so as to provide output signals only from the first, third and fifth cells of the five cells centered over the information track. Should such signals be provided, it is likely that erroneous cell signals are being read—perhaps due to markings on the document—and the information read out is discarded as unreliable.

In the foregoing example, under the assumed conditions of neutral track position, the cells 10–14 inclusive, which are centered about Track B are selected. Similarly, the registration selection matrix 60 will, under these conditions, select the cells 3–7 inclusive which are centered about Track A in the neutral position. Since the registration control signals operate on both registration selection matrices, any misregistration will cause correspondingly shifted cells to be selected in both tracks.

It will be clear from the explanation above that the invention is not limited to a document reader for bar code, but is applicable to any readout apparatus wherein compensation must be made for the misregistration of the storage medium during the readout process. Similarly, the invention is not confined to the precise configuration shown. It will be obvious that the number of discrete sensing cells which are employed may vary with the size of the scanned area and the nature of the image. Variations are also possible in the number of cells selected from the total number covering a track, which will depend on the particular requirements of the situation. It will be further understood that the invention is equally applicable to a storage medium where only a single track of relevant information is scanned.

It will be apparent from the foregoing disclosure of the invention that numerous modifications, changes and equivalents will now occur to those skilled in the art, all of which fall within the true spirit and scope contemplated by the invention.

What is claimed is:

1. Apparatus for reading out a storage medium, comprising a plurality of data scanning means adapted to bracket a track of relevent information on said storage medium during the readout of the latter, reference means for sensing any misregistration of said track from a normally neutral position, said reference means being coupled to be energized only by said data scanning means and means responsive to said reference means for selecting from said plurality a group of scanning means substantially centered over said track under the prevailing conditions of misregistration.

2. Apparatus for reading out a storage medium comprising a plurality of data scanning means adapted to bracket a track of relevant information on said storage medium during the readout of the latter, said plurality of scanning means being positioned adjacent each other and each being adapted to scan a continuous segment of predetermined width on said storage medium, reference means for sensing the amount of misregistration of said track in segment widths from a normally neutral position, said reference means being coupled to be energized only by said data scanning means and means responsive to said reference means for selecting from said plurality a group of scanning means substantially centered over said track under the prevailing conditions of misregistration.

3. Apparatus for reading out a storage medium, comprising a first group of scanning cells bracketing a track of relevant information on said storage medium during the relative motion between the latter and said cells, said track including at least one boundary spaced from extraneous information on said storage medium, a second group of scanning cells bracketing said boundary, means responsive to the medium portion scanned by each of said cells for deriving an output signal therefrom, means responsive to the output signals from said second group for deriving control signals respectively indicative of the degree of misregistration of said track from a normally neutral position, and means responsive to the prevailing one of said control signals for selecting from said first cell group a lesser number of cells substantially centered over said track under the corresponding conditions of misregistration.

4. The apparatus of claim 3 and further comprising means operative during a limited time interval following a change in the degree of misregistration for concurrently providing the previous and the superseding registration control signals.

5. Apparatus for scanning relevant information stored in a storage medium, said relevant information normally occupying a neutral position with respect to said scanning apparatus but being capable of displacement therefrom, comprising a column of adjacent sensing cells bracketing said relevant information, each of said cells being adapted to provide an output signal in accordance with the information sensed by it, a first group of adjacent cells within said column bracketing said relevant information in said neutral position and constituting less than the total number of cells in said column, a second group of adjacent cells within said column less than said first group occupying an end portion of said column, means for logically combining the signals derived from said second cell group to obtain registration control signals each indicative of a different displacement position of said relevant information with respect to said neutral position, and means responsive to the prevailing registration control signal for selecting from the signal of said first cell group a lesser number of signals derived from adjacent cells centered about said displacement position.

6. The apparatus of claim 5 and further comprising means responsive to the presence of at least a majority of said last-recited number of signals for providing a single signal representative of said scanned relevant information.

7. The apparatus of claim 5 and further comprising means responsive to the presence of at least a majority of said last-recited number of signals, including at least a pair of signals derived from mutually adjacent sensing means, for providing a single signal representative of said scanned relevant information.

8. Apparatus for scanning the information stored in at least a pair of tracks adjoining each other along a common boundary in a storage medium, said pair of tracks being capable of a limited amount of displacement from a normally neutral position with respect to said scanning apparatus, comprising a column of adjacent sensing cells bracketing said pair of tracks, each cell being adapted to provide an output signal in accordance with the information sensed by it, first and second pluralities of adjacent cells in said column each bracketing a track inclusive of said common boundary when said tracks are in said neutral position, a third plurality of cells occupying one end portion of said column, means for logically combining the output signals of said third plurality of cells to derive registration control signals each indicative of a different amount of track displacement from said neutral position, means responsive to the prevailing registration control signal to select from each of said first and second pluralities of cells respectively a lesser number of adjacent cells centered about the displacement position of the corresponding track indicated by said registration control signal, and means corresponding to each of said tracks for providing a single track signal in response to the presence of output signals from at least a majority of said selected cells including at least a pair of adjacent cells.

9. In a document reader of the type wherein a limited area, including at least a pair of relevant information tracks, is illuminated during the movement of the document in a first direction, said tracks including a common boundary and a free boundary spaced from extraneous information appearing on said document, a scanning station including a column of light-sensitive cells bracketing a magnified, projected image of said illuminated area, the movement of said document in said first direction permitting a limited amount of orthogonal track displacement to produce a corresponding displacement of said image from a normally neutral position with respect to said cells, each of said cells being adapted to provide an output signal in accordance with the information sensed by it, separate amplifying and triggering means energized by each of said output signals, said column including first and second pluralities of adjacent cells each bracketing a different one of said pair of tracks inclusive of said common boundary when said neutral position obtains, said column further including a third plurality of adjacent cells bracketing one of said free track boundaries, A.C. detection means coupled to each of said third plurality of cells adapted to provide a signal having a first level when information is scanned by the associated cell and a second level when a space is scanned, means for logically combining the signals derived from said A.C. detection means to provide registration control signals each indicative of a different amount of displacement of said image from said neutral position, a pair of registration selection matrices each coupled to one of said first and second pluralities of cells through said amplifying and triggering means, each of said last-recited matrices being responsive to the prevailing registration control signal to select a group of cells substantially centered about the image of the associated track in its displacement position, and means for deriving a track signal from each of said selected cell groups.

10. The apparatus of claim 9 wherein each of said A.C. detection means further includes an inherent delay adapted to prevent signal level switching at its output following a change of its input signal when said change is reversed within a predetermined time interval.

11. The apparatus of claim 9 and further including a plurality of crossover hold circuits each connected to receive a different signal at its input from said logical combining means, each of said crossover hold circuits comprising a gate having one input leg directly coupled to said input, a delay amplifier coupled between said input and the other input leg of said gate, and an inverter connected to said gate adapted to provide said registration control signal at its output.

12. The apparatus of claim 9 wherein each of said registration selection matrices comprises means for gating said registration control signals with the signals obtained from the corresponding one of said plurality of cells, said selected group of cells providing a number of signals which constitute one-half of the signals derived from said corresponding plurality of cells.

13. The apparatus of claim 9 wherein said last-recited means includes a pair of majority selection matrices each coupled to one of said selected cell groups, each of said last-recited matrices including gating means responsive to the presence of output signals from at least a majority of the cells of said selected group to provide a single track signal.

14. The apparatus of claim 13 wherein said gating means are connected to be responsive to signals from said majority of cells only if the latter cells include at least a pair of adjacent cells.

15. In a document reader, apparatus for scanning a pair of horizontal code tracks positioned vertically adjacent each other on a horizontally moving document, said code tracks having a common boundary and a free boundary vertically spaced from extraneous document information, each of said tracks containing information visually represented in the form of a di-bit bar code, a vertical column of adjacent identical cells each responsive to incident light to provide a corresponding output signal, means for projecting a magnified image of an illuminated document area onto said cell column, a mask shielding said cell column and admitting said image to said cells through a vertical slit, said cell column vertically bracketing that portion of said image which contains said pair of tracks, said image normally occupying a neutral position with respect to said cells but being capable of vertical displacement therefrom, amplifying and triggering means connected to each of said cells to provide an A.C. output signal in response to scanned transitions between code bars of different light reflectivity on said document, first and second identical pluralities of adjacent cells in said column each bracketing a different track of said image inclusive of said common track boundary when said neutral position obtains, a third plurality of cells occupying a terminal portion of said column and bracketing said free track boundary of said image, detection means connected to the output of the triggering means associated with said third plurality of cells to provide bilevel signals in response to the presence or absence of A.C. signals, means for logically combining said bilevel signals to derive registration control signals each of said last-recited signals being indicative of a different degree of said vertical image displacement from said neutral portion expressed step-wise in terms of number of cells, a pair of registration selection matrices each energized by signals derived from one of said first and second pluralities of cells respectively, each of said registration selection matrices being responsive to the prevailing registration control signal to select one-half of all the applied signals which are derived from adjacent cells centered about the corresponding displacement position, and a pair of majority selection matrices each adapted to provide a single track signal in response to the presence of at least a majority of said selected signals, at least a pair of which are derived from adjacent cells.

16. The apparatus of claim 15 wherein each of said detection means has an inherent delay characteristic to produce a signal level change at its output only in response to a change of the applied input signal that is not reversed within a predetermined time interval.

17. The apparatus of claim 16 and further comprising means for maintaining each prevailing registration control signal for a limited time interval following the initiation of the superseding registration control signal.

References Cited

UNITED STATES PATENTS

| | | | |
|---|---|---|---|
| 2,932,006 | 4/1960 | Glauberman | 340—149 |
| 3,104,369 | 9/1963 | Rabinow et al. | 340—146.3 |
| 3,140,466 | 7/1964 | Greanias et al. | 340—146.3 |

DARYL W. COOK, *Acting Primary Examiner.*

MAYNARD R. WILBUR, A. L. NEWMAN, *Assistant Examiners.*